(12) United States Patent
Craig et al.

(10) Patent No.: US 11,913,119 B2
(45) Date of Patent: Feb. 27, 2024

(54) FORMING COOLING APERTURE(S) IN A TURBINE ENGINE COMPONENT

(71) Applicant: Raytheon Technologies Corporation, Farmington, CT (US)

(72) Inventors: Brian Craig, Palm Beach Gardens, FL (US); James M. Koonankeil, Marlborough, CT (US); Brian T. Hazel, Avon, CT (US); Paul E. Denney, Northborough, MA (US); Dominic J. Mongillo, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 370 days.

(21) Appl. No.: 17/401,966

(22) Filed: Aug. 13, 2021

(65) Prior Publication Data
US 2023/0052181 A1    Feb. 16, 2023

(51) Int. Cl.
*C23C 28/00*    (2006.01)
*G01N 22/00*    (2006.01)

(52) U.S. Cl.
CPC ............. *C23C 28/34* (2013.01); *G01N 22/00* (2013.01)

(58) Field of Classification Search
None
See application file for complete search history.

(56) References Cited

U.S. PATENT DOCUMENTS

| 4,762,464 | A  | 8/1988  | Vertz |
| 6,234,755 | B1 | 5/2001  | Bunker |
| 6,368,060 | B1 | 4/2002  | Fehrenbach |
| 6,420,677 | B1 | 7/2002  | Emer |
| 6,663,919 | B2 | 12/2003 | Farmer |
| 6,909,800 | B2 | 6/2005  | Vaidyanathan |
| 7,019,257 | B2 | 3/2006  | Stevens |
| 7,041,933 | B2 | 5/2006  | Forrester |
| 7,328,580 | B2 | 2/2008  | Lee |
| 7,820,267 | B2 | 10/2010 | Fahndrich |
| 7,964,087 | B2 | 6/2011  | Lee |
| 7,997,868 | B1 | 8/2011  | Liang |
| 8,057,181 | B1 | 11/2011 | Liang |

(Continued)

FOREIGN PATENT DOCUMENTS

| CN | 111665806 A | 9/2020 |
| EP | 985802 A    | 3/2000 |

(Continued)

OTHER PUBLICATIONS

EP search report for EP22190408.9 dated Apr. 25, 2023.

*Primary Examiner* — Shamim Ahmed
*Assistant Examiner* — Bradford M Gates
(74) *Attorney, Agent, or Firm* — Getz Balich LLC

(57) ABSTRACT

A manufacturing method is provided during which a preform component for a turbine engine is provided. The preform component includes a substrate and a locating feature at an exterior surface of the substrate. An outer coating is applied over the substrate. The outer coating covers the locating feature. At least a portion of the preform component and the outer coating are scanned with an imaging system to provide scan data indicative of a location of the locating feature. A cooling aperture is formed in the substrate and the outer coating based on the scan data.

20 Claims, 14 Drawing Sheets

(56) References Cited

U.S. PATENT DOCUMENTS

| | | |
|---|---|---|
| 8,157,526 B2 | 4/2012 | Beck |
| 8,168,912 B1 | 5/2012 | Liang |
| 8,245,519 B1 | 8/2012 | Liang |
| 8,672,613 B2 | 3/2014 | Bunker |
| 8,814,500 B1 | 8/2014 | Liang |
| 8,905,713 B2 | 12/2014 | Bunker |
| 9,468,991 B2 | 10/2016 | McDowell |
| 9,518,317 B2 | 12/2016 | Eminoglu |
| 9,598,979 B2 | 3/2017 | Reed |
| 9,650,900 B2 | 5/2017 | Malak |
| 9,696,035 B2 | 7/2017 | Starkweather |
| 9,765,623 B2 | 9/2017 | Kottilingam |
| 9,945,233 B2 | 4/2018 | Tanaka |
| 10,006,293 B1 | 6/2018 | Jones |
| 10,113,433 B2 | 10/2018 | Morris |
| 10,208,602 B2 | 2/2019 | Thornton |
| 10,280,763 B2 | 5/2019 | Torkaman |
| 10,350,684 B2 | 7/2019 | Bunker |
| 10,619,499 B2 | 4/2020 | Kottilingam |
| 10,815,796 B2 | 10/2020 | Burd |
| 2005/0092725 A1 | 5/2005 | Byrd |
| 2005/0173388 A1* | 8/2005 | Lavers .............. B23H 9/10 |
| | | 205/665 |
| 2009/0169394 A1* | 7/2009 | Crow .............. B23K 26/389 |
| | | 219/69.17 |
| 2009/0248355 A1 | 10/2009 | Kriegmair |
| 2010/0282721 A1 | 11/2010 | Bunker |
| 2012/0102959 A1 | 5/2012 | Starkweather |
| 2012/0167389 A1 | 7/2012 | Lacy |
| 2012/0205355 A1 | 8/2012 | Münzer |
| 2013/0020293 A1 | 1/2013 | Elfizy |
| 2014/0271129 A1 | 9/2014 | Mueller |
| 2015/0258634 A1* | 9/2015 | Basdere .............. B23K 26/0622 |
| | | 29/889.71 |
| 2016/0195273 A1 | 7/2016 | Burd |
| 2016/0298462 A1 | 10/2016 | Thornton |
| 2016/0356498 A1 | 12/2016 | Gerendas |
| 2017/0089579 A1 | 3/2017 | Bunker |
| 2017/0261208 A1 | 9/2017 | Starkweather |
| 2017/0320163 A1 | 11/2017 | Hu |
| 2017/0335691 A1 | 11/2017 | Crites |
| 2018/0347370 A1 | 12/2018 | Lacy |
| 2019/0085705 A1 | 3/2019 | Webster |
| 2019/0101004 A1 | 4/2019 | Rudolph |
| 2019/0106994 A1 | 4/2019 | Ng |
| 2019/0134752 A1 | 5/2019 | Grafton-Reed |
| 2020/0190990 A1 | 6/2020 | Hohenstein |
| 2020/0217207 A1 | 7/2020 | Loebig |
| 2021/0060709 A1 | 3/2021 | Thayer |

FOREIGN PATENT DOCUMENTS

| | | |
|---|---|---|
| EP | 1967696 B1 | 3/2017 |
| EP | 2886798 B1 | 10/2018 |
| GB | 2389330 B | 5/2004 |
| JP | 2013100771 A | 5/2013 |
| WO | 2020068130 A1 | 4/2020 |

* cited by examiner

FORMING COOLING APERTURE(S) IN A TURBINE ENGINE COMPONENT

BACKGROUND OF THE DISCLOSURE

1. Technical Field

This disclosure relates generally to a turbine engine and, more particularly, to cooling apertures and formation thereof in a component of the turbine engine.

2. Background Information

A gas turbine engine includes various fluid cooled components such as turbine blades and turbine vanes. Such fluid cooled components may include one or more cooling apertures extending through a sidewall of the respective component. Various methods are known in the art for forming cooling apertures. While these known cooling aperture formation methods have various benefits, there is still room in the art form improvement.

SUMMARY OF THE DISCLOSURE

According to an aspect of the present disclosure, a manufacturing method is provided during which a preform component for a turbine engine is provided. The preform component includes a substrate and a locating feature at an exterior surface of the substrate. An outer coating is applied over the substrate. The outer coating covers the locating feature. At least a portion of the preform component and the outer coating are scanned with an imaging system to provide scan data indicative of a location of the locating feature. A cooling aperture is formed in the substrate and the outer coating based on the scan data.

According to another aspect of the present disclosure, another manufacturing method is provided during which a preform component for a turbine engine is provided. The preform component includes a substrate. An outer coating is applied over the substrate. A first section of a cooling aperture is formed in at least the outer coating using a first machining process. A second section of the cooling aperture is formed in the substrate based on a location of a locating feature at an end of the first section.

According to still another aspect of the present disclosure, another manufacturing method is provided during which a preform component for a turbine engine is provided. The preform component includes a substrate. An outer coating is applied over the substrate. A diffuser section of a cooling aperture is formed in the outer coating and the substrate using a first machining process. An indentation is formed in the substrate at an end of the diffuser section. A meter section of the cooling aperture is formed in the substrate using a second machining process, where the meter section is formed based on a location of the indentation.

The locating feature may be formed during the forming of the first section.

The locating feature may be configured as or otherwise include an indentation at the end of the first section.

The locating feature may be configured as or otherwise include a protrusion at the end of the first section.

The locating feature may be configured as or otherwise include an indentation in the exterior surface of the substrate.

The locating feature may be configured as or otherwise include a protrusion projecting out from the exterior surface of the substrate.

The locating feature may be removed during the forming of the cooling aperture.

The imaging system may be configured as or otherwise include a microwave imaging system.

The method may also include applying an inner coating onto the substrate. The outer coating may be applied onto the inner coating.

The cooling aperture may include a meter section and a diffuser section.

The cooling aperture may include a first section and a second section. The forming of the cooling aperture may include: forming the first section in at least the exterior coating using a first machining process; and forming the second section in the substrate using a second machining process that is different than the first machining process.

The method may also include forming a second locating feature at an end of the first section. The second section may be formed based on a location of the second locating feature.

The second locating feature may be formed during the forming of the first section.

The substrate may be configured from or otherwise include metal.

The outer coating may be configured from or otherwise include ceramic.

The cooling aperture may be configured as a single lobed diffuser section.

The cooling aperture may be configured as a multi-lobed diffuser section.

The preform component may be configured as or otherwise include a preform of an airfoil for the turbine engine.

The preform component may be configured as or otherwise include a preform of a flowpath wall for the turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes methods for manufacturing fluid cooled components of a gas turbine engine. For ease of description, the turbine engine may be described below as a turbofan turbine engine. The present disclosure, however, is not limited to such an exemplary gas turbine engine. The turbine engine, for example, may alternatively be configured as a turbojet turbine engine, a turboprop turbine engine, a turboshaft turbine engine, a propfan turbine engine, a pusher fan turbine engine or an auxiliary power unit (APU) turbine engine. The turbine engine may be configured as a geared turbine engine or a direct drive turbine engine. The present disclosure is also not limited to aircraft applications. The turbine engine, for example, may alternatively be configured as a ground-based industrial turbine engine for power generation, or any other type of turbine engine which utilizes fluid cooled components.

Figure 1:
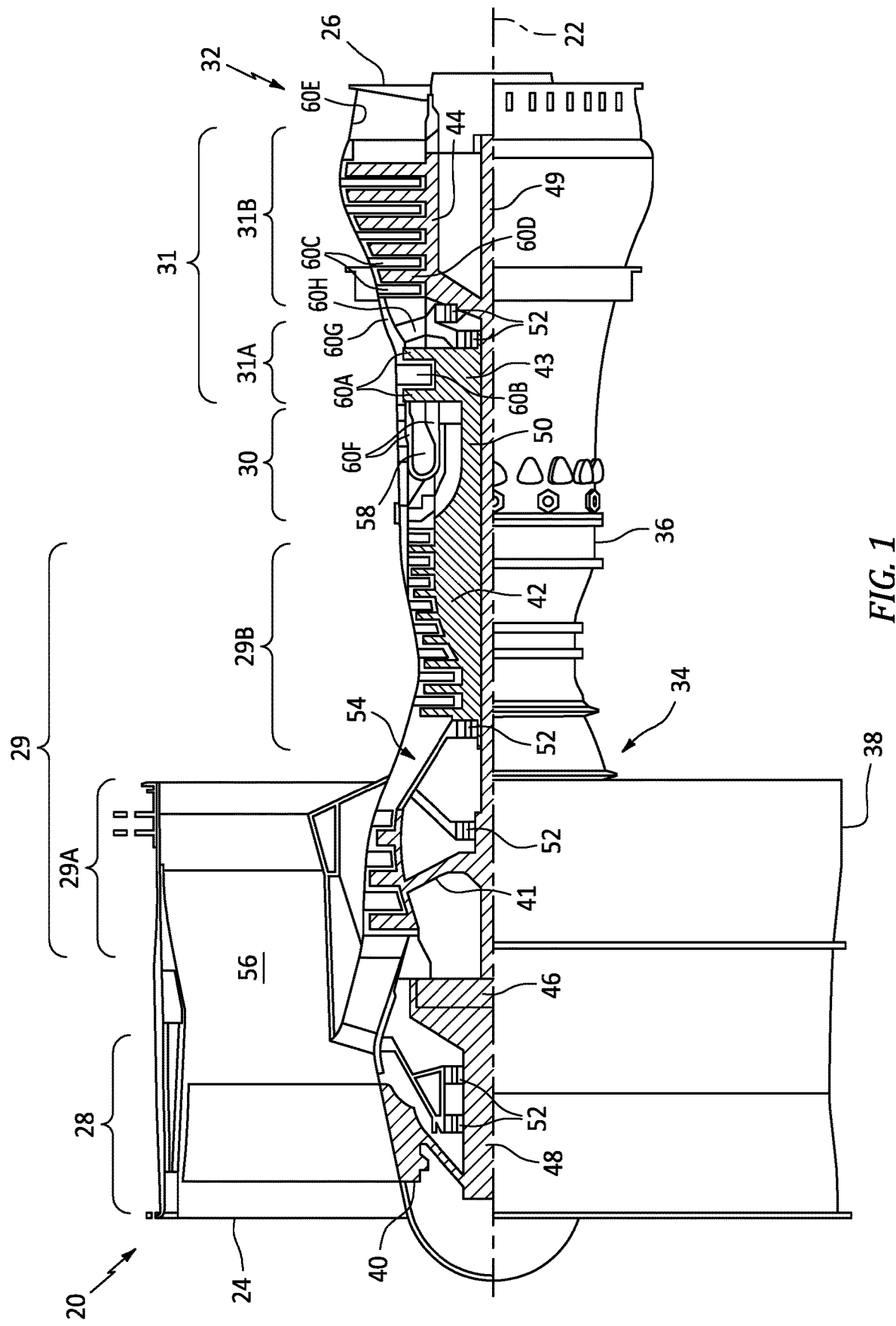
FIG. 1 is a side cutaway illustration of a geared turbofan turbine engine.

FIG. 1 is a side cutaway illustration of the turbofan turbine engine 20. This turbine engine 20 extends along an axial centerline 22 between a forward, upstream airflow inlet 24 and an aft, downstream airflow exhaust 26. The turbine engine 20 includes a fan section 28, a compressor section 29, a combustor section 30, a turbine section 31 and an exhaust section 32 (partially shown in FIG. 1). The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31 are arranged sequentially along the axial centerline 22 within an engine housing 34. This engine housing 34 includes an inner case 36 (e.g., a core case) and an outer case 38 (e.g., a fan case). The inner case 36 may house one or more of the engine sections 29A-31B; e.g., an engine core. The outer case 38 may house at least the fan section 28.

Each of the engine sections 28, 29A, 29B, 31A and 31B includes a respective rotor 40-44. Each of these rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 40 is connected to a gear train 46, for example, through a fan shaft 48. The gear train 46 and the LPC rotor 41 are connected to and driven by the LPT rotor 44 through a low speed shaft 49. The HPC rotor 42 is connected to and driven by the HPT rotor 43 through a high speed shaft 50. The shafts 48-50 are rotatably supported by a plurality of bearings 52; e.g., rolling element and/or thrust bearings. Each of these bearings 52 is connected to the engine housing 34 by at least one stationary structure such as, for example, an annular support strut.

During operation, air enters the turbine engine 20 through the airflow inlet 24. This air is directed through the fan section 28 and into a core flowpath 54 and a bypass flowpath 56. The core flowpath 54 extends sequentially through the engine sections 29A-32. The air within the core flowpath 54 may be referred to as "core air". The bypass flowpath 56 extends through a bypass duct, which bypasses the engine core. The air within the bypass flowpath 56 may be referred to as "bypass air".

The core air is compressed by the LPC rotor 41 and the HPC rotor 42 and directed into a combustion chamber 58 of a combustor in the combustor section 30. Fuel is injected into the combustion chamber 58 and mixed with the compressed core air to provide a fuel-air mixture. This fuel air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from a core airflow inlet. The rotation of the LPT rotor 44 also drives rotation of the fan rotor 40, which propels bypass air through and out of the bypass flowpath 56. The propulsion of the bypass air may account for a majority of thrust generated by the turbine engine 20, e.g., more than seventy-five percent (75%) of engine thrust. The turbine engine 20 of the present disclosure, however, is not limited to the foregoing exemplary thrust ratio.

The turbine engine 20 includes a plurality of fluid cooled components (e.g., 60A-H; generally referred to as "60") arranged within, for example, the combustor section 30, the turbine section 31 and/or the exhaust section 32. Examples of these fluid cooled components 60 include airfoils such as, but not limited to, a rotor blade airfoil (e.g., 60A, 60D) and a stator vane airfoil (e.g., 60B, 60C, 60H). Other examples of the fluid cooled components 60 include flowpath walls such as, but not limited to, a combustor wall (e.g., 60F), an exhaust duct wall (e.g., 60E), a shroud or other flowpath wall (e.g., 60G), a rotor blade platform and a stator vane platform. Of course, various other fluid cooled components may be included in the turbine engine 20, and the present disclosure is not limited to any particular types or configurations thereof.

Figure 2:
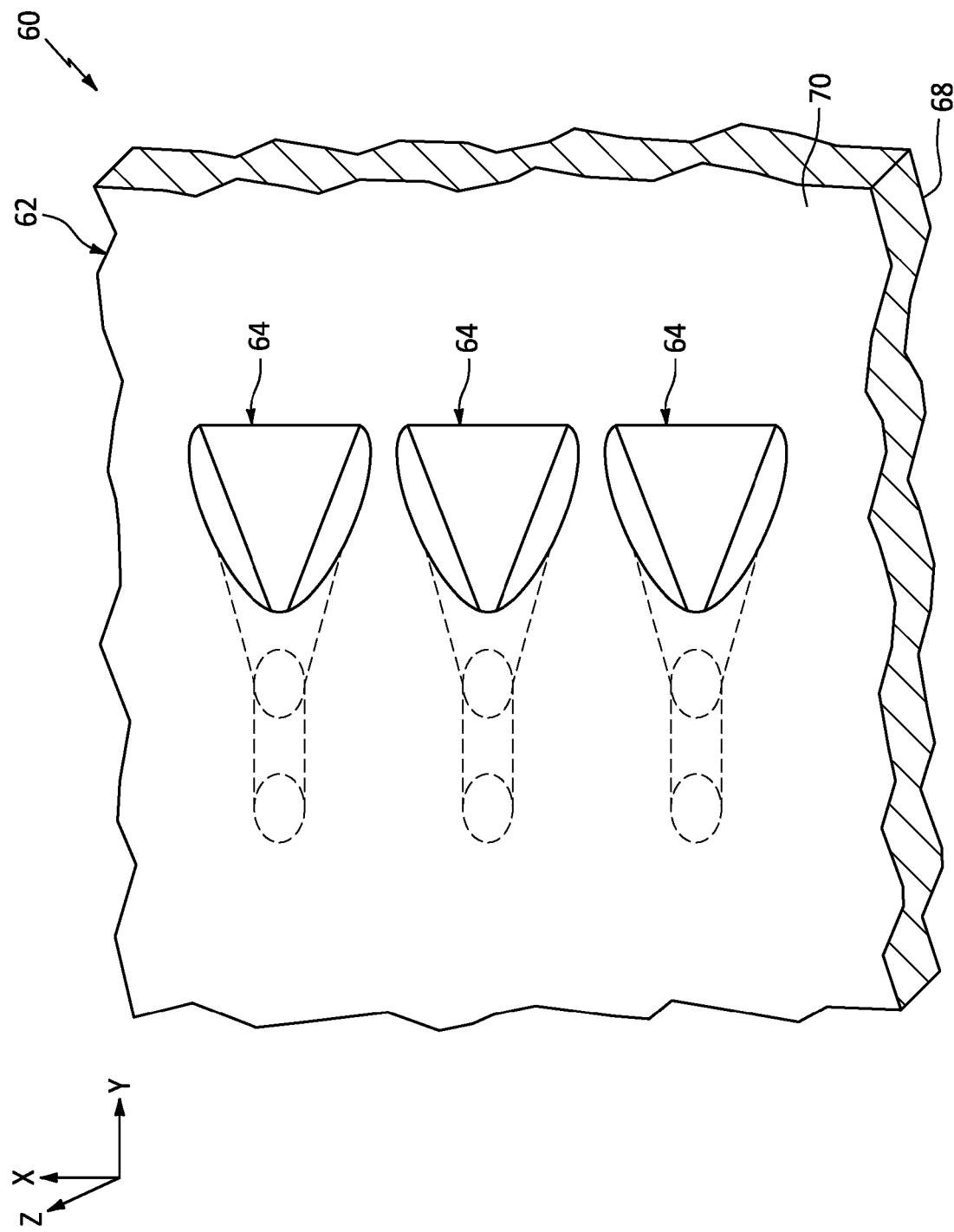
FIG. 2 is a perspective illustration of a portion of a fluid cooled component.

FIG. 2 illustrates a portion of one of the fluid cooled components 60 within the turbine engine 20. This fluid cooled component 60 has a component wall 62 (e.g., a sidewall or an endwall) configured with one or more cooling apertures 64.

Figure 3:
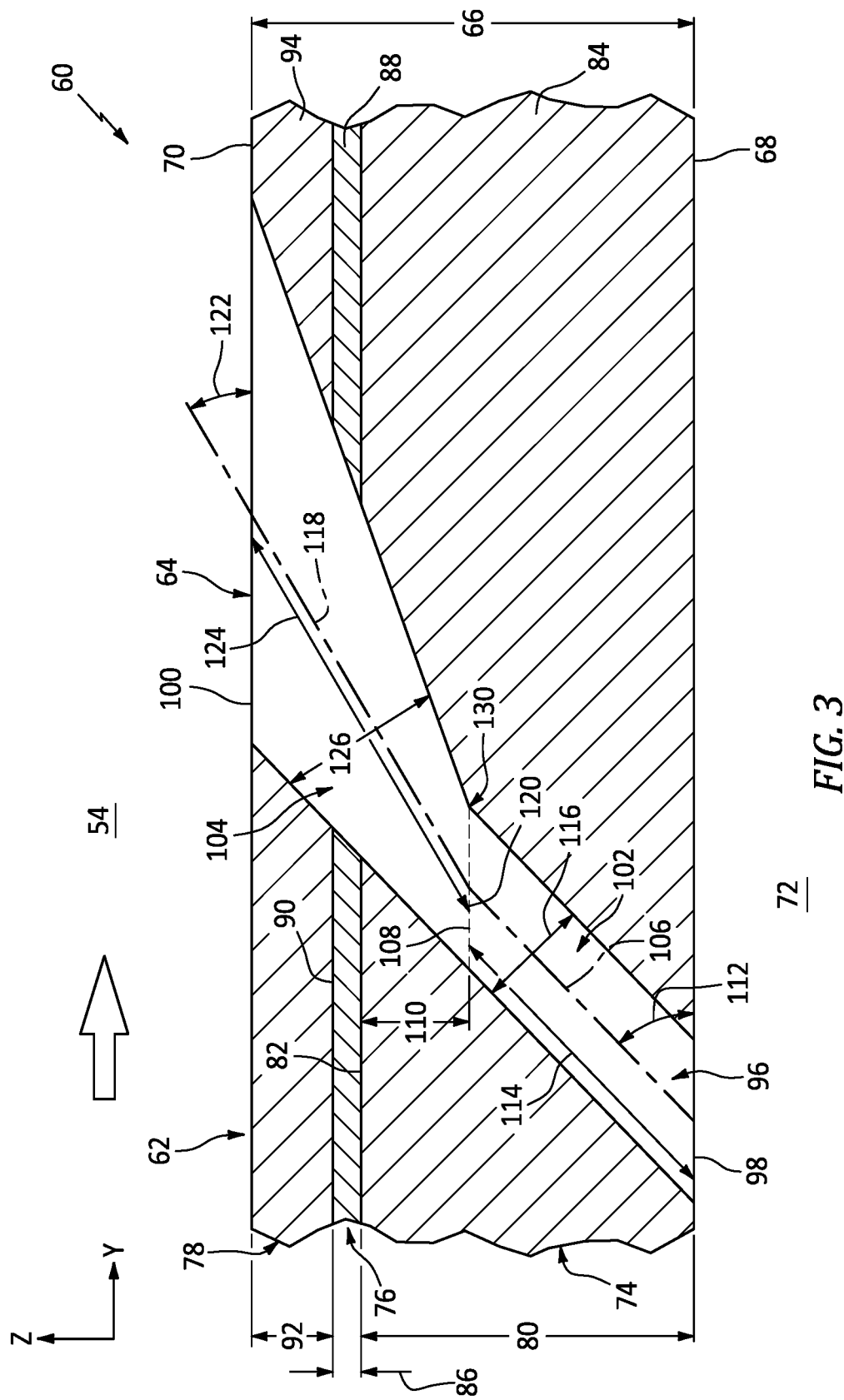
FIG. 3 is a sectional illustration of a portion of the fluid cooled component taken along a centerline of a cooling aperture.

Referring to FIG. 3, the component wall 62 has a thickness 66 that extends vertically (e.g., along a z-axis) between and to a first surface 68 and a second surface 70. The component first surface 68 may be configured as an interior and/or a cold side surface of the component wall 62. The component first surface 68, for example, may at least partially form a peripheral boundary of a cooling fluid volume 72 (e.g., a cavity or a passage) along the component wall 62. The component first surface 68 may thereby be subject to relatively cool fluid (e.g., cooling air) supplied to the cooling fluid volume 72. This cooling fluid volume 72 may be an internal volume formed within the fluid cooled component 60 where, for example, the component is an airfoil. Alternatively, the cooling fluid volume 72 may be an external volume formed external to the fluid cooled component 60 where, for example, the component is a flowpath wall. The component second surface 70 may be configured as an exterior and/or a hot side surface of the component wall 62. The component second surface 70, for example, may at least partially form a peripheral boundary of a portion of, for example, the core flowpath 54 along the component wall 62. The component second surface 70 may thereby be subject to relative hot fluid (e.g., combustion products) flowing through the core flowpath 54 within, for example, one of the engine sections 30-32 of FIG. 1.

The component wall 62 of FIG. 3 includes a component substrate 74 and one or more external component coatings 76 and 78. The component substrate 74 at least partially or completely forms and carries the component first surface 68. The component substrate 74 has a thickness 80 that extends vertically (e.g., along the z-axis) between and to the component first surface 68 and a second surface 82 of the component substrate 74. This substrate second surface 82 may be configured as an exterior surface of the component substrate 74 prior to being (e.g., partially or completely) covered by the one or more component coatings 76 and 78. The substrate thickness 80 may be greater than one-half (½) of the wall thickness 66. The substrate thickness 80, for example, may be between two-third (⅔) and four-fifths (⅘) of the wall thickness 66.

The component substrate 74 is constructed from substrate material 84. This substrate material 84 may be an electrically conductive material. The substrate material 84, for example, may be or otherwise include metal. Examples of the metal include, but are not limited to, nickel (Ni), titanium (Ti), aluminum (Al), chromium (Cr), cobalt (Co), and alloys thereof. The metal, for example, may be a nickel or cobalt based superalloy such as, but not limited to, PWA 1484 or PWA 1429.

The inner coating 76 may be configured as a bond coating between the component substrate 74 and the outer coating 78. The inner coating 76 of FIG. 3 is bonded (e.g., directly) to the substrate second surface 82. The inner coating 76 at least partially or completely covers the substrate second surface 82 (e.g., along an x-y plane of FIG. 2). The inner coating 76 has a thickness 86 that extends vertically (e.g., along the z-axis) between and to component substrate 74 and the outer coating 78. This inner coating thickness 86 may be less than one-seventh (⅐) of the wall thickness 66. The inner coating thickness 86, for example, may be between one-eighth (⅛) and one-fortieth (1/40) of the wall thickness 66.

The inner coating 76 is constructed from inner coating material 88. This inner coating material 88 may be an electrically conductive material. The inner coating material 88, for example, may be or otherwise include metal. Examples of the metal include, but are not limited to, MCrAlY and MAlCrX, where "M" is nickel (Ni), cobalt (Co), iron (Fe) or any combination thereof, and where "Y" or "X" is hafnium (Hf), yttrium (Y), silicon (Si) or any combination thereof. The MCrAlY and MAlCrX may be further modified with strengthening elements such as, but not limited to, tantalum (Ta), rhenium (Re), tungsten (W), molybdenum (Mo) or any combination thereof. An example of the MCrAlY is PWA 286.

The inner coating 76 may be formed from a single layer of the inner coating material 88. The inner coating 76 may alternatively be formed from a plurality of layers of the inner coating material 88, where the inner coating material 88 within each of those inner coating layers may be the same as one another or different from one another.

The outer coating 78 may be configured as a protective coating for the component substrate 74 and, more generally, the fluid cooled component 60. The outer coating 78, for example, may be configured as a thermal barrier layer and/or an environmental layer. The outer coating 78 at least partially or completely forms and carries the component second surface 70. The outer coating 78 of FIG. 2 is bonded (e.g., directly) to a second (e.g., exterior) surface 90 of the inner coating 76. The outer coating 78 at least partially or completely covers the inner coating second surface 90 as well as the underlying substrate second surface 82 (e.g., along an x-y plane of FIG. 2). The outer coating 78 has a thickness 92 that extends vertically (e.g., along the z-axis) between and to the inner coating 76 and the component second surface 70. This outer coating thickness 92 may be less than one-half (½) of the wall thickness 66. The outer coating thickness 92, for example, may be between one-third (⅓) and one-eighth (⅛) of the wall thickness 66. The outer coating thickness 92, however, may be greater than the inner coating thickness 86.

The outer coating 78 is constructed from outer coating material 94. This outer coating material 94 may be a non-electrically conductive material. The outer coating material 88, for example, may be or otherwise include ceramic. Examples of the ceramic include, but are not limited to, yttria stabilized zirconia (YSZ) and gadolinium zirconate (GdZ). The outer coating material 94 of the present disclosure is not limited to non-electrically conductive materials. In other embodiments, for example, the outer coating material 94 may be an electrically conductive material; e.g., metal.

The outer coating 78 may be formed from a single layer of the outer coating material 94. The outer coating 78 may alternatively be formed from a plurality of layers of the outer coating material 94, where the outer coating material 94 within each of those outer coating layers may be the same as one another or different from one another. For example, the outer coating 78 may include a thin interior layer of the YSZ and a thicker exterior later of the GdZ.

Each of the cooling apertures 64 extends along a respective longitudinal centerline 96 between and to an inlet 98 of the respective cooling aperture 64 and an outlet 100 of the respective cooling aperture 64. The cooling aperture inlet 98 of FIG. 3 is located in the component first surface 68. The cooling aperture inlet 98 thereby fluidly couples its respective cooling aperture 64 with the cooling fluid volume 72 along the component first surface 68. The cooling aperture outlet 100 of FIG. 3 is located in the component second surface 70. The cooling aperture outlet 100 thereby fluidly couples its respective cooling aperture 64 with the core flowpath 54 along the component second surface 70.

Each of the cooling apertures 64 may include a meter section 102 and a diffuser section 104. The meter section 102 is disposed at (e.g., on, adjacent or proximate) the cooling aperture inlet 98. The meter section 102 is configured to meter (e.g., regulate) a flow of cooling fluid flowing from the cooling fluid volume 72, through the substrate material 84, to the diffuser section 104. The diffuser section 104 is disposed at the cooling aperture outlet 100. The diffuser section 104 is configured to diffuse the cooling fluid exhausted (e.g., directed out) from the cooling aperture outlet 100 into, for example, a film for cooling a downstream portion of the component second surface 70.

The meter section 102 of FIG. 3 extends longitudinally along the longitudinal centerline 96 within (e.g., partially into) the component substrate 74. More particularly, the meter section 102 extends longitudinally along a meter segment 106 of the longitudinal centerline 96 (e.g., a centerline of the meter section 102) from the cooling aperture inlet 98 to an outlet 108 of the meter section 102. The meter section outlet 108 of FIG. 3 is disposed vertically within the component substrate 74 intermediately between the component first surface 68 and the substrate second surface 82. The meter section outlet 108 of FIG. 3 is thereby vertically recessed into the component substrate 74 by a vertical distance 110 (e.g., along the z-axis).

The longitudinal centerline 96 and its (e.g., entire) meter segment 106 of FIG. 3 are angularly offset from the component first surface 68 by an included angle 112. This meter segment angle 112 may be an acute angle. The meter segment angle 112, for example, may be between ten degrees (10°) and eighty degrees (80°); e.g., between twenty degrees (20°) and thirty degrees (30°).

The meter section 102 has a longitudinal length 114 measured along the meter segment 106 between the cooling aperture inlet 98 and the meter section outlet 108. The meter section 102 has a lateral width 116 (e.g., diameter) measured along a line perpendicular to the meter section 102 of the longitudinal centerline 96. The meter section lateral width 116 may be different (e.g., smaller or larger) than or equal to the meter section longitudinal length 114.

Figure 4:
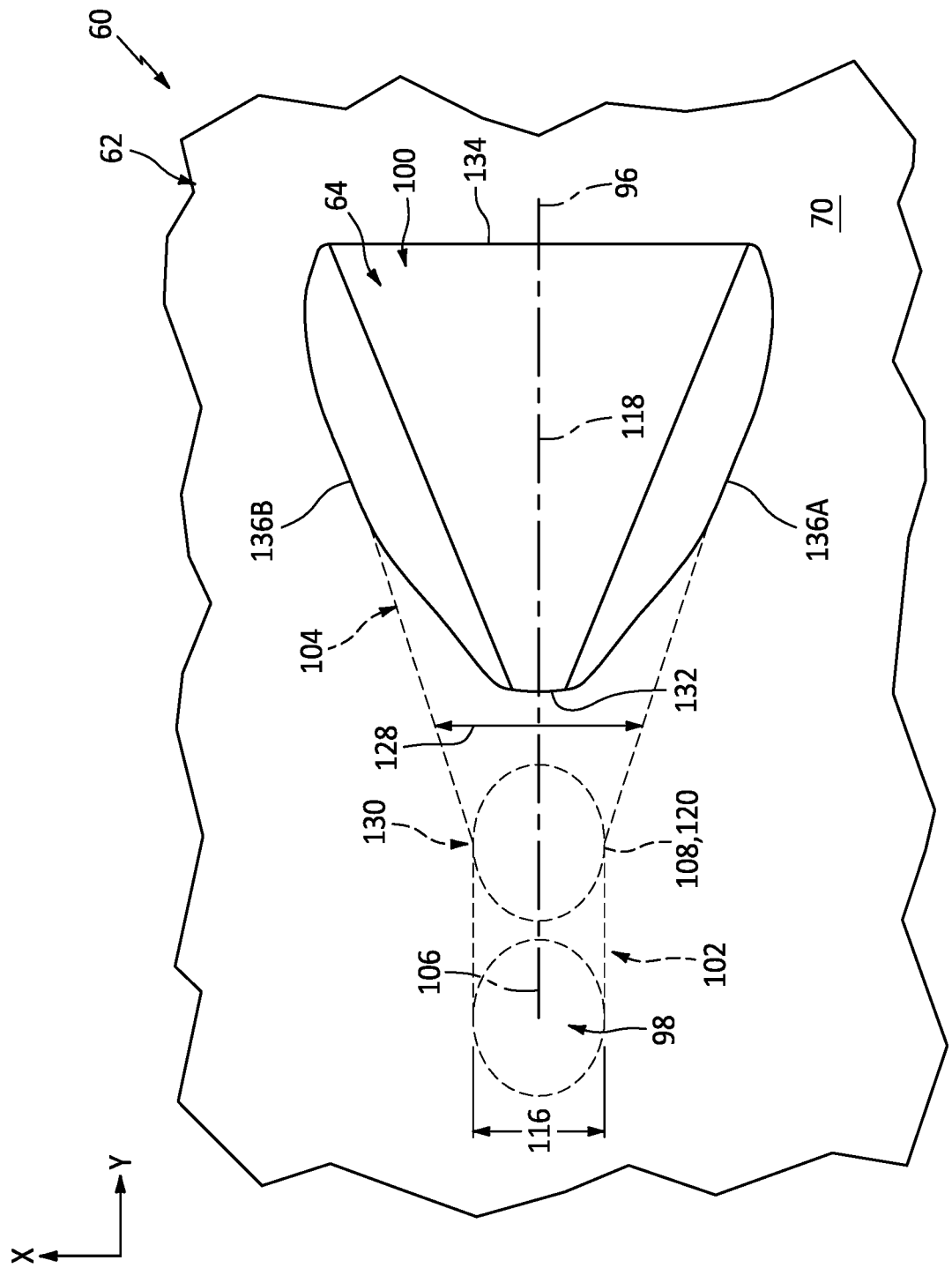
FIG. 4 is a side illustration of a portion of the fluid cooled component and the cooling aperture.

The meter section 102 has a cross-sectional geometry when viewed, for example, in a plane perpendicular to its meter segment 106 (or the x-y plane). This meter section cross-sectional geometry may be uniform along the longitudinal length 114 of the meter section 102. Referring to FIG. 4, the meter section cross-sectional geometry may be circular, oval, elliptical or otherwise annular in shape. The present disclosure, however, is not limited to such exemplary annular shapes.

The diffuser section 104 of FIG. 3 extends longitudinally along the longitudinal centerline 96 out of the component substrate 74, through the inner coating 76 and the outer coating 78. More particularly, the diffuser section 104 of FIG. 3 extends longitudinally along a diffuser segment 118 of the longitudinal centerline 96 (e.g., a centerline of the diffuser section 104) from an inlet 120 of the diffuser section 104 (here, the same as the meter section outlet 108), through the materials 84, 88 and 94, to the cooling aperture outlet 100. The diffuser section inlet 120 of FIG. 3 is disposed vertically within the component substrate 74 intermediately between the component first surface 68 and the substrate second surface 82. The diffuser section inlet 120 of FIG. 3 is thereby vertically recessed into the component substrate 74 by the vertical distance 110 (e.g., along the z-axis).

The longitudinal centerline 96 and its (e.g., entire) diffuser segment 118 of FIG. 3 are angularly offset from the component second surface 70 by an included angle 122. This diffuser segment angle 122 may be an acute angle. The diffuser segment angle 122, for example, may be between twenty degrees (20°) and eighty degrees (80°); e.g., between thirty-five degrees (35°) and fifty-five degrees (55°). The diffuser segment angle 122 of FIG. 3 is different (e.g., less) than the meter segment angle 112. The diffuser segment 118 may thereby be angularly offset from the meter segment 106.

The diffuser section 104 has a longitudinal length 124 measured along the diffuser segment 118 between the diffuser section inlet 120 and the cooling aperture outlet 100. This diffuser section longitudinal length 124 may be equal to or different (e.g., less or greater) than the meter section longitudinal length 114. The diffuser section 104 has a lateral width 126, 128 (see FIG. 4) measured along a respective line perpendicular to the diffuser segment 118 of the longitudinal centerline 96. The diffuser section lateral width 126, 128 may be different (e.g., smaller or larger) than or equal to the diffuser section longitudinal length 124. The diffuser section lateral width 126, 128 of FIGS. 3 and 4 at the interface 130 between the diffuser section 104 and the meter section 102 is equal to the meter section lateral width 116. However, the diffuser section lateral width 126, 128 of FIGS. 3 and 4 at other locations along the longitudinal centerline 96 may be greater than meter section lateral width 116. More particularly, the diffuser section 104 laterally diverges as the diffuser section 104 projects longitudinally away from the meter section 102 towards or to the cooling aperture outlet 100.

The diffuser section 104 has a cross-sectional geometry when viewed, for example, in a plane perpendicular to its diffuser segment 118. This diffuser section cross-sectional geometry changes as the diffuser section 104 projects longitudinally away from the meter section 102, sequentially through the materials 84, 88 and 94 of FIG. 3, to the cooling aperture outlet 100.

Referring to FIG. 4, the cooling aperture outlet 100 may have a complex cross-sectional geometry when viewed, for example, a plane parallel with the component second surface 70 (e.g., the x-y plane). This outlet cross-sectional geometry may include a (e.g., curved or straight) leading edge section 132, a (e.g., curved or straight) trailing edge section 134 and opposing (e.g., curved or straight) sidewall sections 136A and 136B (generally referred to as "136"). Each of the sidewall sections 136 extends between and to respective ends of the leading and the trailing edge sections 132 and 134. A lateral width of the leading edge section 132 may be different (e.g., smaller) than a lateral width of the trailing edge section 134. The sidewall sections 136 may thereby generally laterally diverge away from one another as the sidewall sections 136 extend from the leading edge section 132 to the trailing edge section 134.

Figure 6:
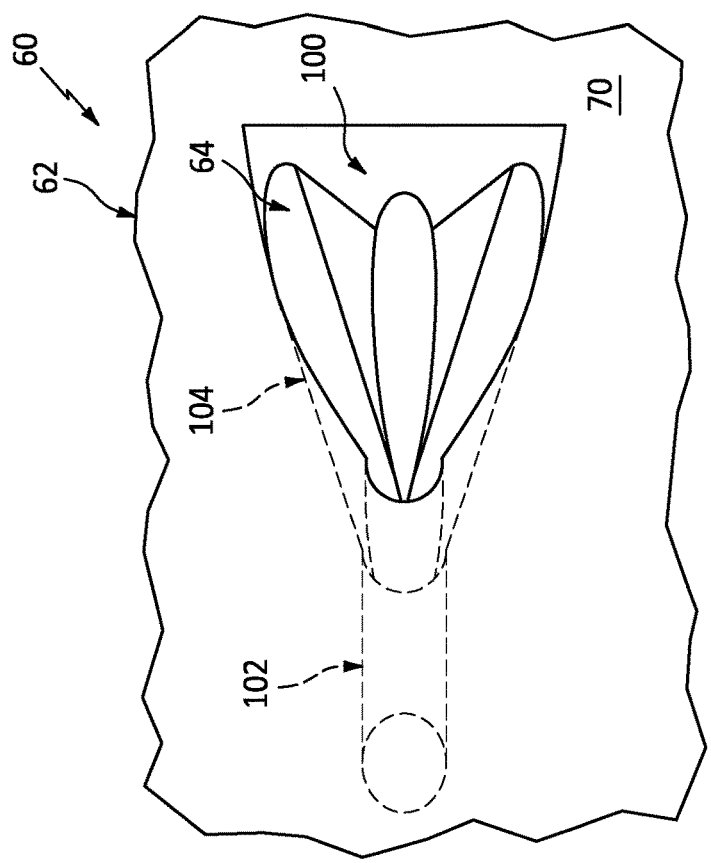
FIGS. 5 and 6 are side illustrations of portions of the fluid cooled component configured with various multi-lobed cooling apertures.
Figure 5:
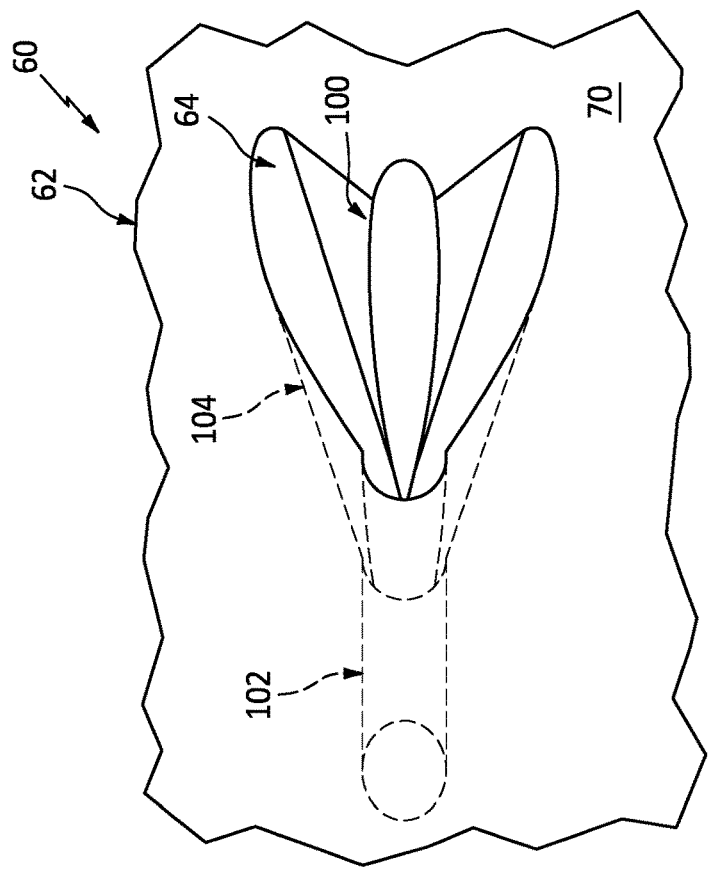

In some embodiments, referring to FIG. 4, the diffuser section 104 may be configured as a single lobe diffuser section. In other embodiments, referring to FIGS. 5 and 6, the diffuser section 104 may be configured as a multi-lobe diffuser section. Various other single lobe and multi-lobe diffuser sections for cooling apertures 64 are known in the art, and the present disclosure is not limited to any particular ones thereof. Further details on various multi-lobe diffuser sections can be found in U.S. Pat. No. 9,598,979, which is assigned to the assignee of the present disclosure and hereby incorporated herein by reference in its entirety.

Figure 7:
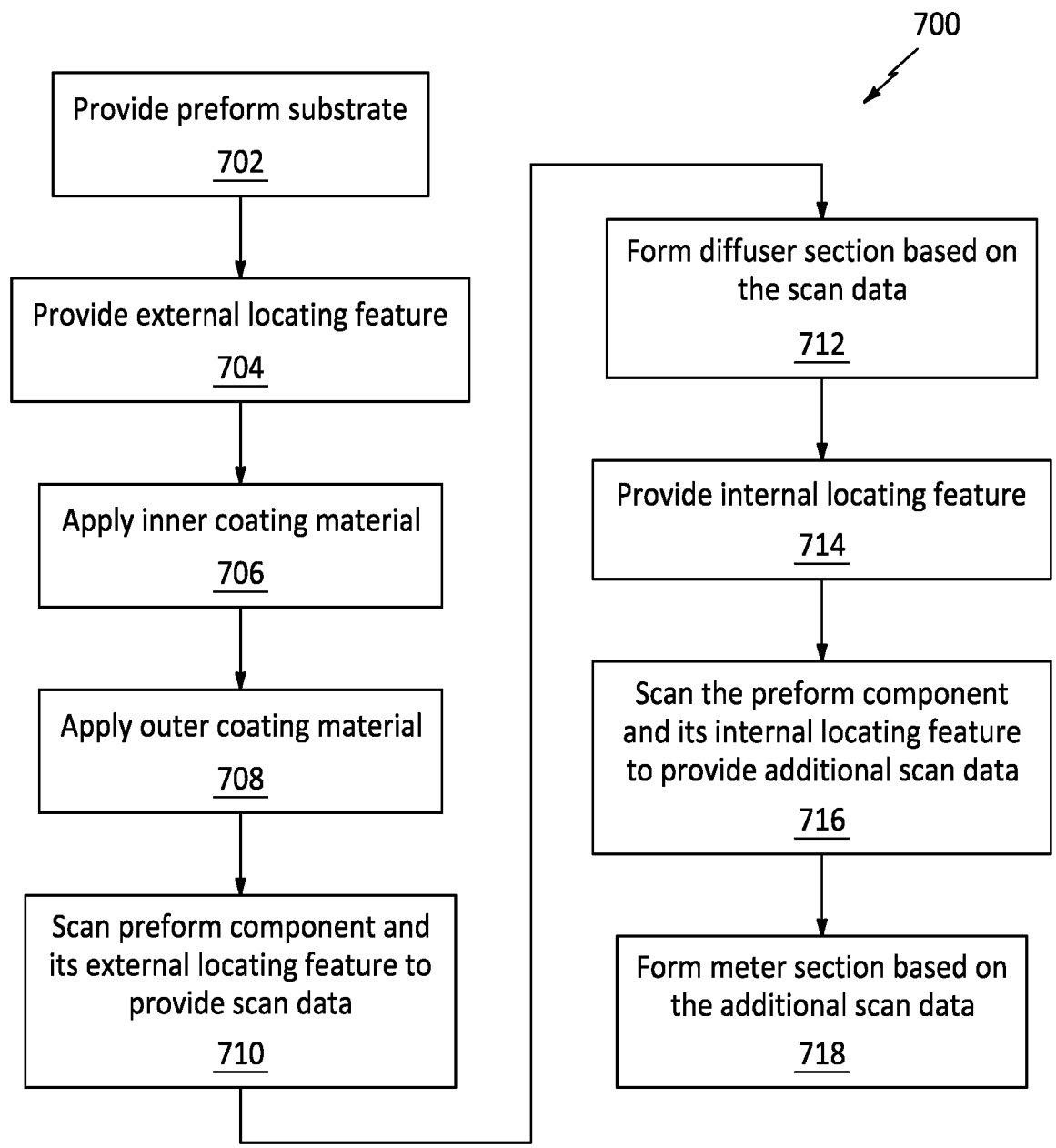
FIG. 7 is a flow diagram of a method for manufacturing a fluid cooled component.

FIG. 7 is a flow diagram of a method 700 for manufacturing a fluid cooled component. For ease of description, the method 700 is described below with reference to the fluid cooled component 60 described above. The method 700 of the present disclosure, however, is not limited to manufacturing such an exemplary fluid cooled component.

Figure 8:
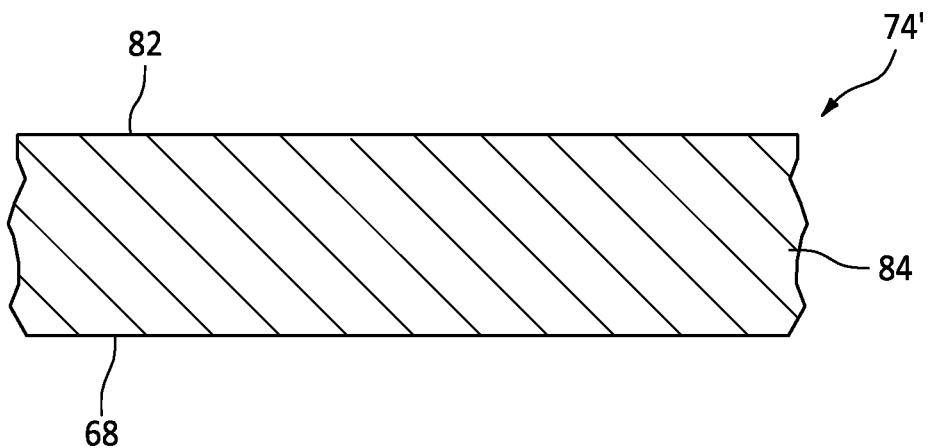
FIG. 8 is a sectional illustration of a portion of a preform substrate.

In step 702, a preform substrate 74' is provided. Referring to FIG. 8, the preform substrate 74' may generally have the configuration (e.g., shape, size, etc.) of the substrate for the fluid cooled component 60 to be formed (e.g., see FIG. 3). The preform substrate 74' of FIG. 8, however, does not include any holes therein for forming the cooling apertures 64.

Figure 9:
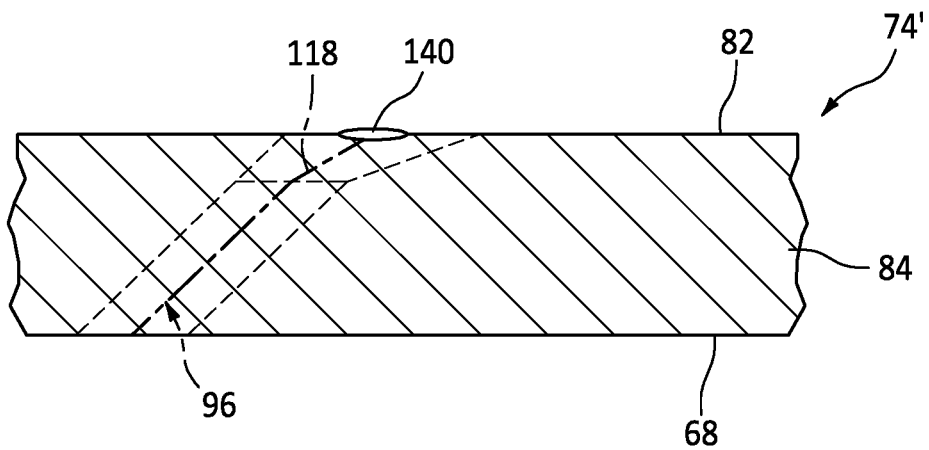
FIG. 9 is a sectional illustration of a portion of the preform substrate configured with an external locating feature.

In step 704, an external locating feature 140 is provided. Referring to FIG. 9, this external locating feature 140 is configured with the preform substrate 74' at (e.g., on, adjacent or proximate) its second surface 82. This external locating feature 140 is configured for locating the to-be-formed cooling aperture 64 (see FIG. 3) as described below in further detail.

The external locating feature 140 may be arranged at a location where the longitudinal centerline 96 and its diffuser segment 118 are to intersect a plane of the second surface 82. The external locating feature 140, for example, may be arranged such that a center of the external locating feature 140 is coincident with the longitudinal centerline 96 and its diffuser segment 118 of the to-be-formed cooling aperture 64 (see FIG. 3).

Figure 10:
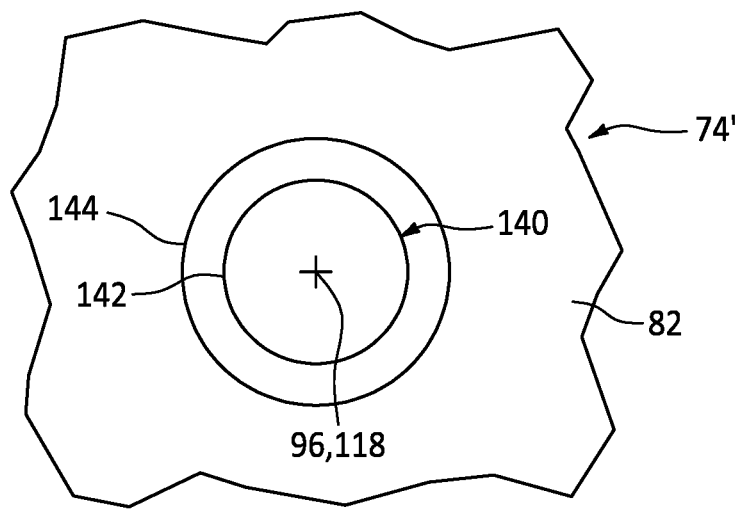
FIG. 10 is an illustration of the external locating feature at an external surface of the preform substrate.

Referring to FIG. 10, the external locating feature 140 may be configured with a footprint 142 (e.g., an outline/a perimeter) that fits (e.g., completely) within a footprint 144 (e.g., an outline/a perimeter) of the to-be-formed cooling aperture 64 and its diffuser section 104 (e.g., see FIG. 3), where the footprints 142 and 144 are viewed in a common plane; e.g., the x-y plane or a plane perpendicular to the longitudinal centerline 96 at the second surface 82. The external locating feature 140 may thereby be sized smaller than the to-be-formed cooling aperture 64 such that, for example, formation of the cooling aperture 64 may (e.g., completely) remove the external locating feature 140. The present disclosure, however, is not limited to such an exemplary relationship.

Figure 11A:
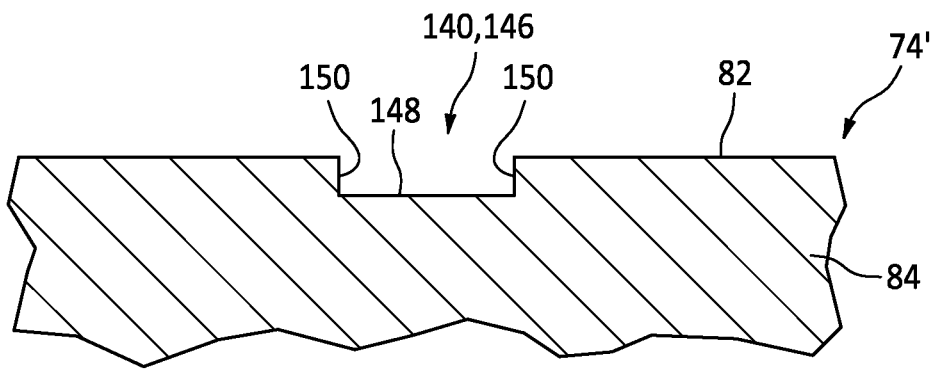
FIGS. 11A and 11B are sectional illustrations of the external locating feature with various configurations.

Referring to FIG. 11A, the external locating feature 140 may be configured as a negative feature. The external locating feature 140 of FIG. 11A, for example, is configured as or otherwise includes an indentation 146 in the second surface 82 of the preform substrate 74'. Examples of the indentation 146 include, but are not limited to, a dimple, a groove, a channel, a recess, a depression, a blind aperture and an etching. The indentation 146 of FIG. 11A extends vertically (e.g., along the z-axis) into the preform substrate 74' from the second surface 82 to an indentation end 148. The indentation 146 of FIG. 11A extends laterally (e.g., along the x-y plane) between opposing indentation sides 150. While the external locating feature 140 of FIG. 11A is shown as a single indentation 146, the present disclosure is not limited thereto. For example, in other embodiments, the external locating feature 140 may include a plurality of the indentations 146; e.g., a cluster of indentations.

Figure 11B:
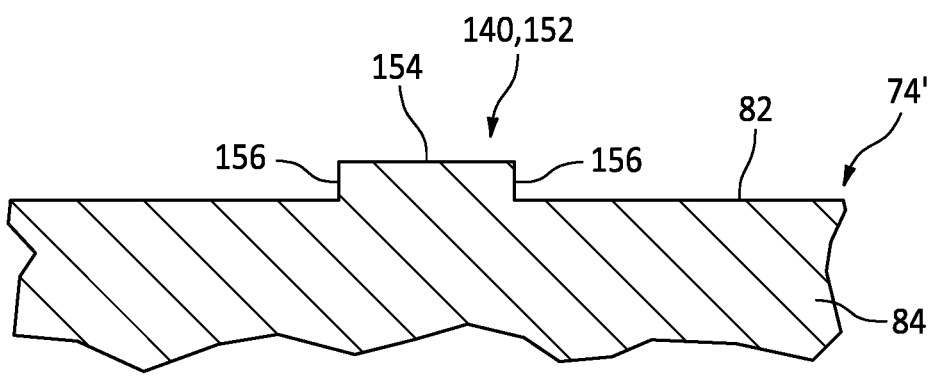

Referring to FIG. 11B, the external locating feature 140 may be configured as a positive feature. The external locating feature 140 of FIG. 11B, for example, is configured as or otherwise includes a protrusion 152 out from the second surface 82 of the preform substrate 74'. Examples of the protrusion 152 include, but are not limited to, a bump, a pedestal, a column, a mound, a rib and a hemisphere. The protrusion 152 of FIG. 11B projects vertically (e.g., along the z-axis) out from the second surface 82 to a protrusion distal end 154. The protrusion 152 of FIG. 11B extends laterally (e.g., along the x-y plane) between opposing protrusion sides 156. While the external locating feature 140 of FIG. 11B is shown as a single protrusion 152, the present disclosure is not limited thereto. For example, in other embodiments, the external locating feature 140 may include a plurality of the protrusions 152; e.g., a cluster of protrusions. It is also contemplated the external locating feature 140 includes a combination of one or more of the protrusions 152 with one or more of the indentations 146.

Figure 12A:
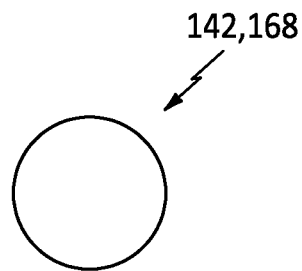
FIGS. 12A-F illustrate various different locating feature footprints.
Figure 12B:
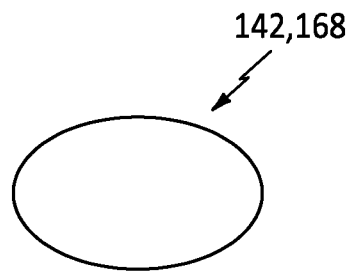
Figure 12C:
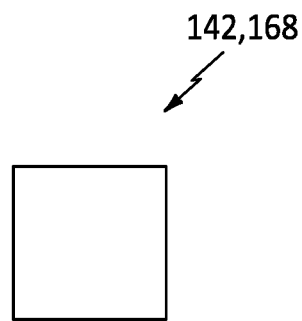
Figure 12D:
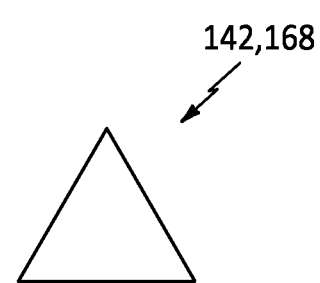
Figure 12E:
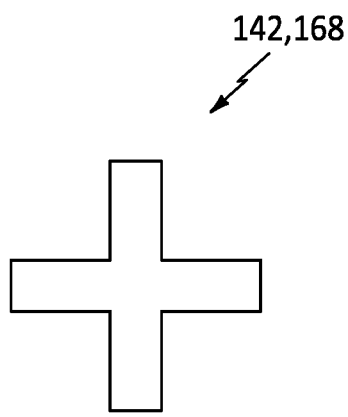
Figure 12F:
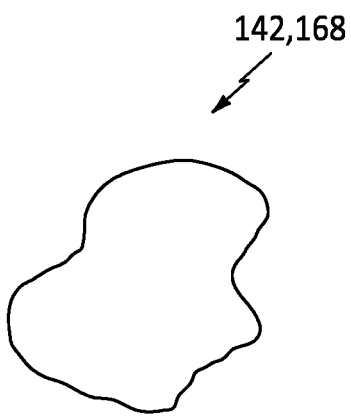

Referring to FIGS. 12A-E, the footprint 142 of the external locating feature 140 may have various shapes. For example, referring to FIGS. 12A and 12B, the external locating feature footprint 142 may be curved; e.g., circular (see FIG. 12A) or oval (see FIG. 12B). Referring to FIGS. 12C-E, the external locating feature footprint 142 may be polygonal; e.g., rectangular (see FIG. 12C), triangular (see FIG. 12D) or cross/X shaped (see FIG. 12E). Referring to FIG. 12F, the external locating feature footprint 142 may be splined (e.g., amorphous) shaped. The present disclosure, however, is not limited to the foregoing exemplary external locating feature footprint shapes.

The external locating feature 140 may be formed using various formation techniques. Examples of these formation techniques include, but are not limited to, machining, etching, additive manufacturing, depositing, coating and welding.

Figure 13:
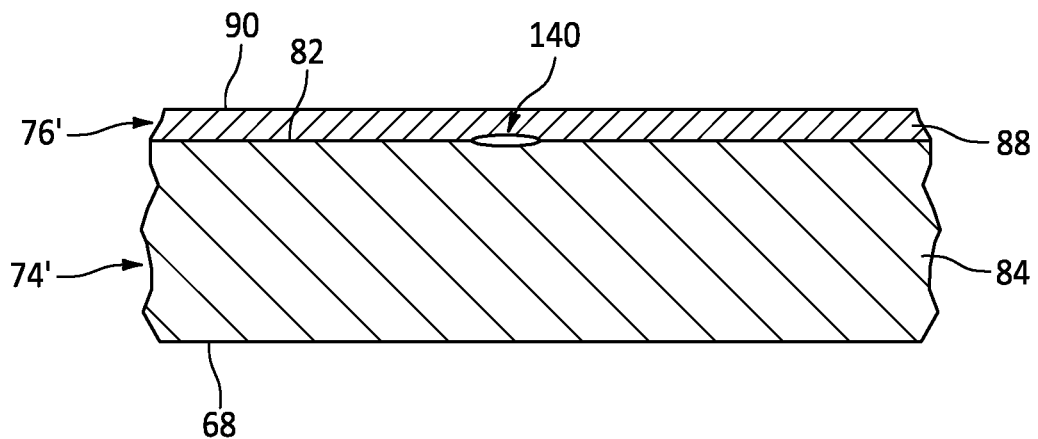
FIG. 13 is a sectional illustration of a portion of the preform substrate further configured with an inner coating.

In step 706, a preform inner coating 76' is applied to the preform substrate 74'. For example, referring to FIG. 13, the inner coating material 88 may be applied (e.g., deposited) onto the second surface 82 of the preform substrate 74'. This inner coating material 88 may cover and/or otherwise visually obscure the external locating feature 140 at the outer surface 82 of the preform substrate 74'.

The inner coating material 88 may be applied using various different inner coating application techniques. Examples of the inner coating application techniques include, but are not limited to, a physical vapor deposition (PVD) process, chemical vapor deposition (CVD) process, a plating process, and a thermal spray process (e.g., a plasma spray (PS) process, a high velocity oxygen fuel (HVOF) process, high velocity air fuel (HVAF) process, a wire spray process or a combustion spray process). The inner coating application may be performed via a non-line-of-sight (NLOS) coating process or a direct-line-of-sight (DLOS) coating process. The preform inner coating 76' of FIG. 13 may generally have the configuration of the inner coating 76 for the fluid cooled component 60 to be formed (e.g., see FIG. 3). The preform inner coating 76' of FIG. 13, however, does not include any holes for forming the cooling apertures 64.

Figure 14:
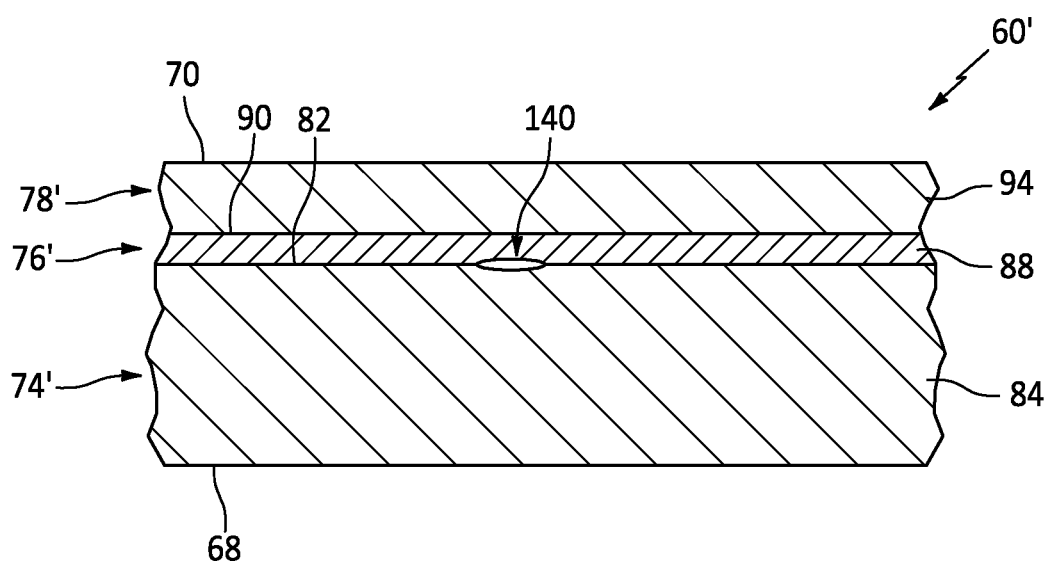
FIG. 14 is a sectional illustration of a portion of the preform substrate further configured with an outer coating.

In step 708, a preform outer coating 78' is applied to the preform inner coating 76'. For example, referring to FIG. 14, the outer coating material 94 may be applied (e.g., deposited) onto the second surface 90 of the preform inner coating 76'. This outer coating material 94 may (e.g., further) cover and/or otherwise visually obscure the external locating feature 140 at the outer surface 82 of the preform substrate 74'.

The outer coating material 94 may be applied using various different outer coating application techniques. Examples of the outer coating application techniques include, but are not limited to, a physical vapor deposition (PVD) process (e.g., an electron-beam PVD process), chemical vapor deposition (CVD) process, a thermal spray process (e.g., a plasma spray (PS) process, a high velocity oxygen fuel (HVOF) process, high velocity air fuel (HVAF) process, a wire spray process or a combustion spray process). The outer coating application may be performed via a non-line-of-sight (NLOS) coating process or a direct-line-of-sight (DLOS) coating process. The preform outer coating 78' of FIG. 14 may generally have the configuration of the outer coating 78 for the fluid cooled component 60 to be formed (e.g., see FIG. 3). The preform outer coating 78' of FIG. 14, however, does not include any holes for forming the cooling apertures 64.

The combination of the preform substrate 74', the preform inner coating 76' and the preform outer coating 78' may provide a preform component 60'. This preform component 60' of FIG. 14 may generally have the configuration of the fluid cooled component 60 to be formed (e.g., see FIG. 3). The preform component 60' of FIG. 14, however, does not include any holes for forming the cooling apertures 64.

The thickness 86 (see FIG. 3) of the inner coating material 88 applied during the step 706 and/or the thickness 92 (see FIG. 3) of the outer coating material 94 applied during the step 708 may fluctuate within an acceptable tolerance range; e.g., along the x-y plane. These fluctuations may provide the preform component 60' with a slightly different exterior surface topology than expected. Therefore, if the cooling aperture 64 was formed at a location in the preform component 60' solely based on the appearance of the exterior surface topology of the preform component 60', then the cooling aperture 64 may (or may not) be slightly laterally offset from its intended (e.g., design) location. The method 700 of the present disclosure may prevent or reduce such cooling aperture location deviation by identifying a location of the to-be-formed cooling aperture 64 based on at least an actual location of the external locating feature 140.

Figure 15:
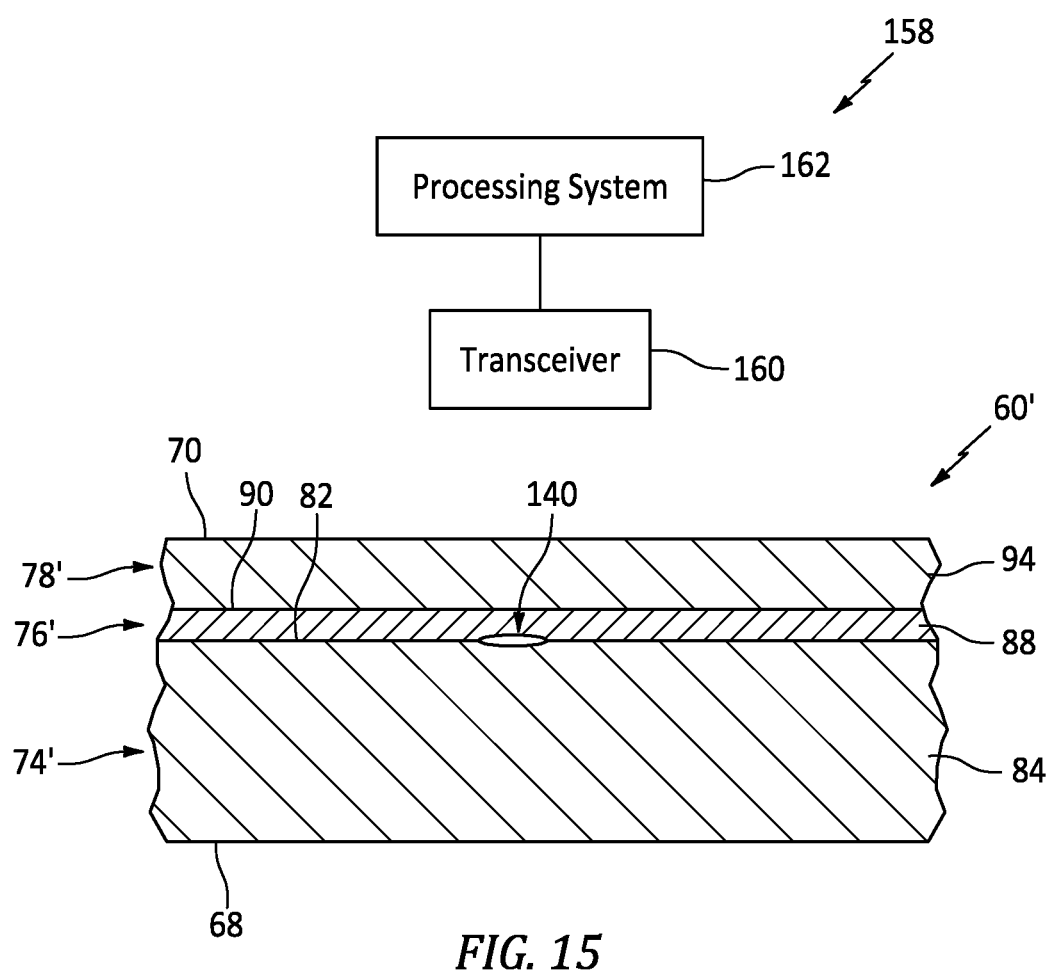
FIG. 15 is a sectional illustration of a preform component located proximate an imaging system.

In step 710, at least a portion of the preform component 60' is scanned with a non-contact, non-destructive imaging system 158. Referring to FIG. 15, this imaging system 158 may be configured as a microwave imaging system.

The imaging system 158 of FIG. 15 may include a microwave transceiver 160 (or a transmitter and a receiver). This transceiver 160 (or the transmitter) is configured to direct (e.g., transmit) microwaves into the preform component 60' from the exterior of the preform component 60'. These microwaves include electromagnetic waves with a predetermined frequency (or frequency range) within a microwave frequency ban of three-hundred mega-Hertz (300 MHz) and three-hundred giga-Hertz (300 GHz). The specific frequency (or frequency range) may be selected/tuned based on the material composition of the preform component 60' and/or the specific geometric configuration of the external locating feature 140. For example, the microwaves may be selected to travel through portions (certain component materials) of the preform component 60'. However, the microwaves may be selected to reflect against other portions (certain component materials) of the preform component 60'. The microwaves may also or alternatively be selected to reflect against certain geometric features; e.g., surfaces, etc. At least some of the reflected microwaves may travel back to and may be received by the transceiver 160 (or the receiver). The transceiver 160 may output information associated with the reflected microwaves as scan data—imaging system output data.

The scan data may be indicative of an internal structure of the scanned portion of the preform component 60'. The scan data, for example, may be used to provide a feature map of the internal structure of the scanned portion of the preform component 60'. This feature map may include location and/or dimensional information for the external locating feature 140. The feature map may also or alternatively include locations and/or dimensional information for one or more of the coatings 76' and 78' and/or the preform substrate 74'. With this information, a processing system 162 (e.g., a computer system) may determine a location and/or an orientation of the external locating feature 140, or at least a portion thereof, relative to the preform component 60' and/or a coordinate system. The external locating feature 140 may thereby provide/correlate with a datum in the scan data.

Figure 16:
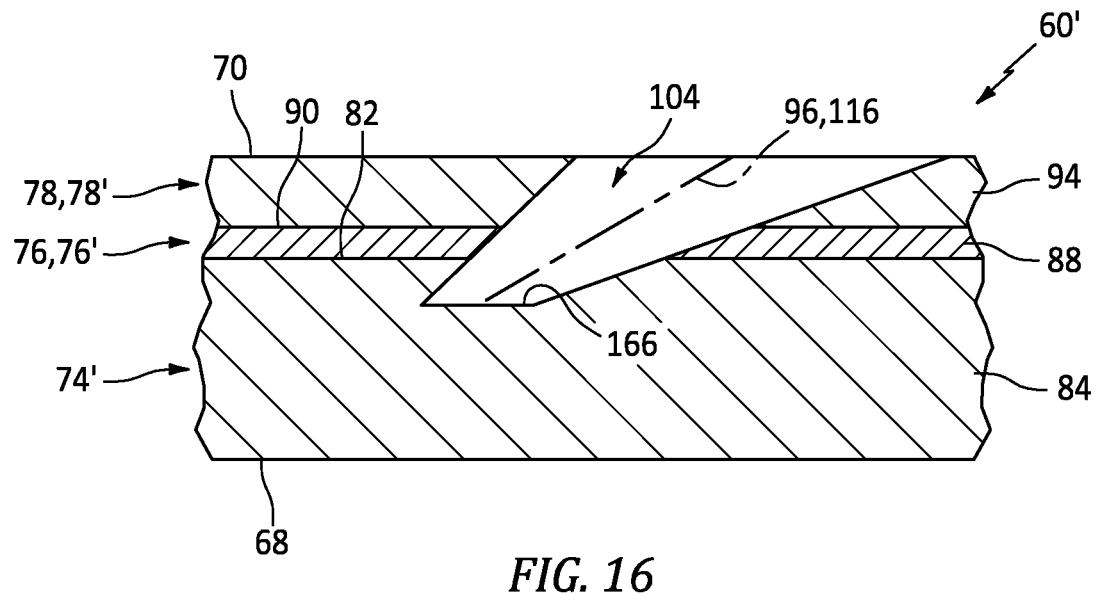
FIG. 16 is a sectional illustration of a portion of the preform component configured with a diffuser section of a cooling aperture.

In step 712, the diffuser section 104 of a respective cooling aperture 64 is formed in the preform component 60' using the scan data as shown, for example, in FIG. 16. For example, since the preform substrate 74' and the external locating feature 140 (see FIG. 15) may be completely covered or otherwise visually obscured by one or more of the external coatings 76', 78', the scan data and the external locating feature location and/or orientation information determined therefrom may be used to locate a position of where and/or an orientation of how the diffuser section 104 should be formed in the preform component 60'. The diffuser section 104 may then be formed at this location/orientation such that the diffuser section 104 is located, for example, as specified in a design specification.

A portion of the outer coating material 94, a portion of the inner coating material 88 and a portion of the underlying substrate material 84 is machined away (from the exterior of the preform component 60') to provide the respective diffuser section 104 of FIG. 16. The diffuser section 104 may be formed in the various materials of the preform component 60' using a diffuser section machining process. This diffuser section machining process is selected to form the diffuser section 104 in the various different electrically conductive and non-electrically conductive materials in the preform component 60'. The diffuser section machining process is also selected to provide the diffuser section 104 with a precise finish geometry. Examples of the diffuser section machining process include, but are not limited to, a laser machining (e.g., ablation) process, a water-jet guided laser (WJGL) machining process, an abrasive water jet (AWJ) machining process, an electron beam machining process, and a mechanical drilling process.

The meter section 102 of the respective cooling aperture 64 may be subsequently formed using a different machining process than the machining process used to form the diffuser section 104. In such embodiments, when two (or more) different machining processes are used to form different portions/sections of the same cooling aperture 64, one tool is moved away and another tool is positioned in its place. The swapping of the tools may open the manufacturing process up to slight lateral misalignments due to, for example, tool manipulator tolerances. To prevent or reduce a magnitude of such lateral misalignment between the diffuser section 104 and the meter section 102 for example, the method 700 of the present disclosure may utilize another locating feature for the forming of the meter section 102.

Figure 17:
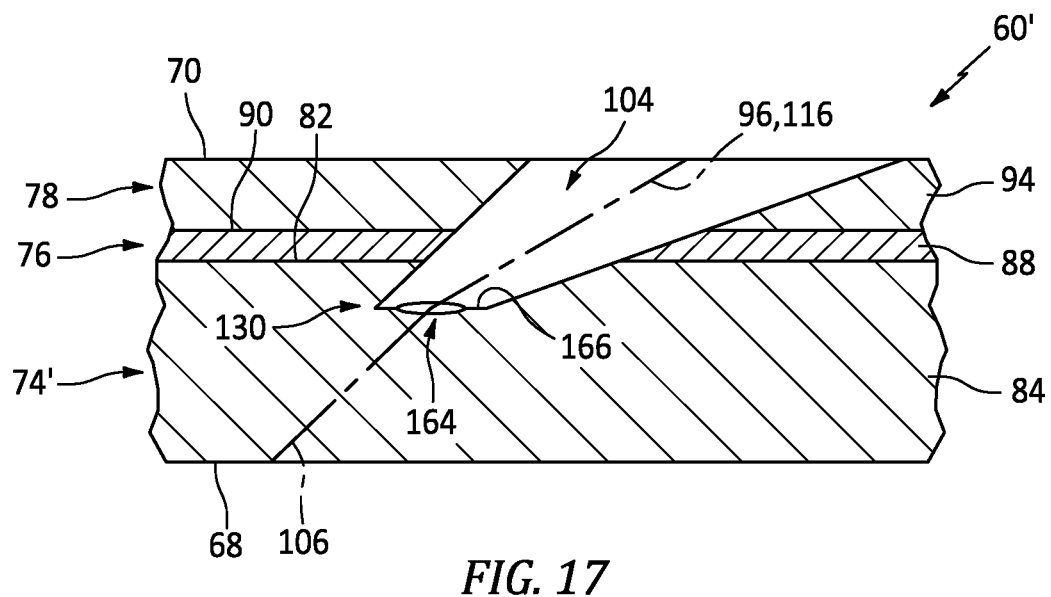
FIG. 17 is a sectional illustration of a portion of the preform component further configured with an internal locating feature.

In step 714, an internal locating feature 164 is provided. Referring to FIG. 17, this internal locating feature 164 is configured with the preform substrate 74' at (e.g., on, adjacent or proximate) an end 166 of the diffuser section 104. This internal locating feature 164 is configured for locating the to-be-formed meter section 102 (see FIG. 3) as described below in further detail.

The internal locating feature 164 may be arranged at a location where the longitudinal centerline 96 and its meter segment 106 are to intersect a plane of the interface 130. The internal locating feature 164, for example, may be arranged such that a center of the internal locating feature 164 is coincident with the longitudinal centerline 96 and its meter segment 106 of the to-be-formed meter section 102 (see FIG. 3).

Figure 18:
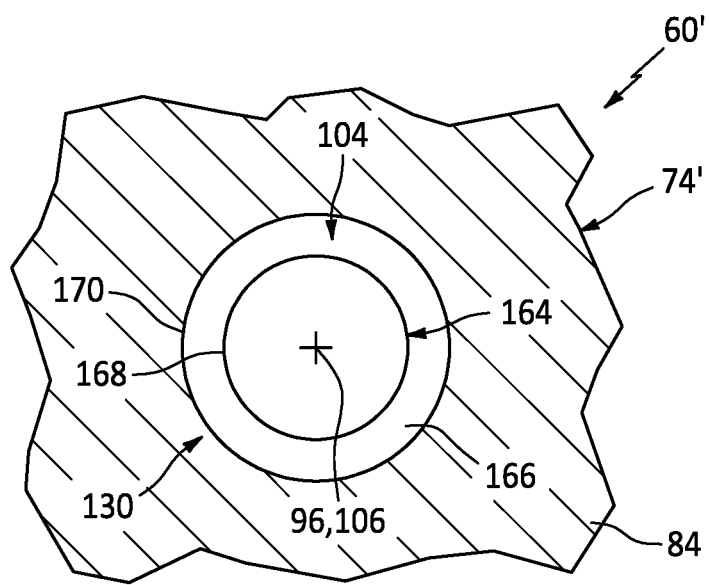
FIG. 18 is a sectional illustration of the preform component with the external locating feature at an end of the diffuser section.

Referring to FIG. 18, the internal locating feature 164 may be configured with a footprint 168 (e.g., an outline/a perimeter) that fits (e.g., completely) within a footprint 170 (e.g., an outline/a perimeter) of the to-be-formed meter section 102 (see FIG. 3), where the footprints 168 and 170 are viewed in a common plane; e.g., the x-y plane or a plane perpendicular to the longitudinal centerline 96 at the interface 130. The internal locating feature 164 may thereby be sized smaller than the to-be-formed meter section 102 such that, for example, formation of the meter section 102 may (e.g., completely) remove the internal locating feature 164. The present disclosure, however, is not limited to such an exemplary relationship.

Figure 19A:
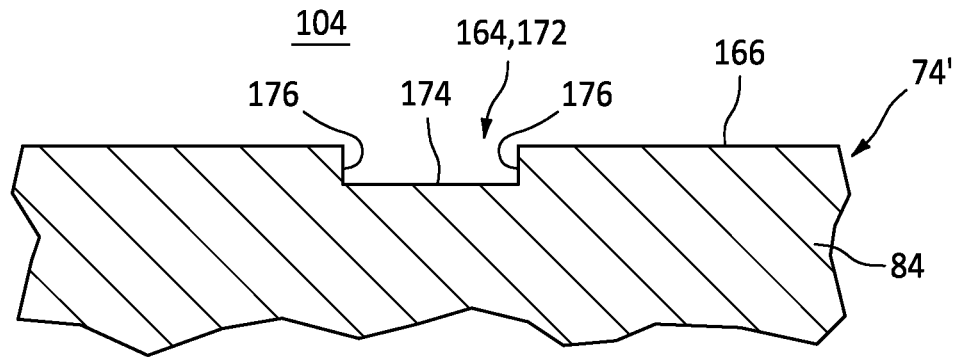
FIGS. 19A and 19B are sectional illustrations of the internal locating feature with various configurations.

Referring to FIG. 19A, the internal locating feature 164 may be configured as a negative feature. The internal locating feature 164 of FIG. 19A, for example, is configured as or otherwise includes an indentation 172 in the end 166 of the diffuser section 102. Examples of the indentation 172 include, but are not limited to, a dimple, a groove, a channel, a recess, a depression, a blind aperture and an etching. The indentation 172 of FIG. 19A extends longitudinally along the longitudinal centerline 96 into the preform substrate 74' from the diffuser section end 166 to an indentation end 174. The indentation 172 of FIG. 19A extends within the preform substrate 74' between opposing indentation sides 176. While the internal locating feature 164 of FIG. 19A is shown as a single indentation 172, the present disclosure is not limited thereto. For example, in other embodiments, the internal locating feature 164 may include a plurality of the indentations 172; e.g., a cluster of indentations.

Figure 19B:
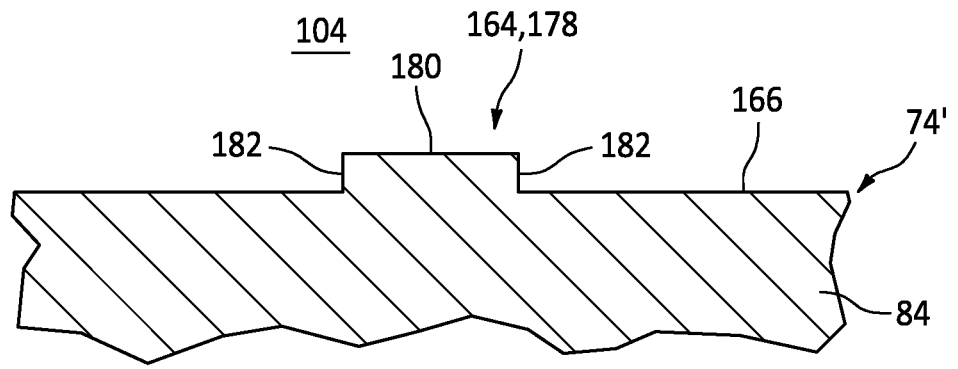

Referring to FIG. 19B, the internal locating feature 164 may be configured as a positive feature. The internal locating feature 164 of FIG. 19B, for example, is configured as or otherwise includes a protrusion 178 out from the diffuser section end 166. Examples of the protrusion 178 include, but are not limited to, a bump, a pedestal, a column, a mound, a rib and a hemisphere. The protrusion 178 of FIG. 19B projects longitudinally along the longitudinal centerline 96 out from the diffuser section end 166 to a protrusion distal end 180. The protrusion 178 of FIG. 19B extends within the preform substrate 74' between opposing protrusion sides 182. While the internal locating feature 164 of FIG. 19B is shown as a single protrusion 178, the present disclosure is not limited thereto. For example, in other embodiments, the internal locating feature 164 may include a plurality of the protrusions 178; e.g., a cluster of protrusions. It is also contemplated the internal locating feature 164 includes a combination of one or more of the protrusions 178 with one or more of the indentations 172.

Referring to FIGS. 12A-E, the footprint 168 of the internal locating feature 164 may have various shapes. For example, referring to FIGS. 12A and 12B, the internal locating feature footprint 168 may be curved; e.g., circular (see FIG. 12A) or oval (see FIG. 12B). Referring to FIGS. 12C-E, the internal locating feature footprint 168 may be polygonal; e.g., rectangular (see FIG. 12C), triangular (see FIG. 12D) or cross/X shaped (see FIG. 12E). Referring to FIG. 12F, the internal locating feature footprint 168 may be splined (e.g., amorphous) shaped. The present disclosure, however, is not limited to the foregoing exemplary internal locating feature footprint shapes.

The internal locating feature 164 may be formed using various formation techniques. Examples of these formation techniques include, but are not limited to, machining, etching, additive manufacturing, depositing, coating and welding. For example, the internal locating feature 164 may be formed at the diffuser section end 166 during (e.g., near an end of) the formation of the diffuser section 104 during the step 712.

Figure 20:
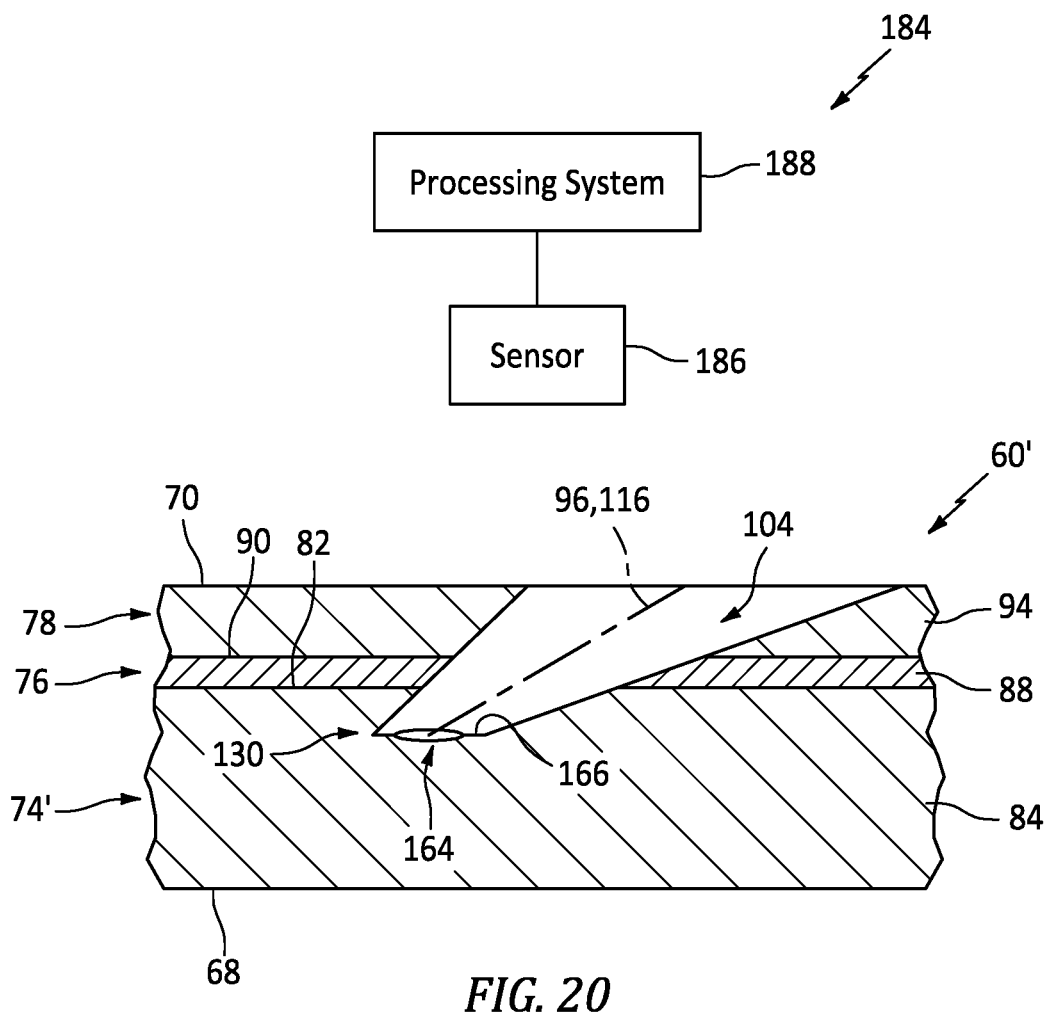
FIG. 20 is a sectional illustration of the preform component located proximate another imaging system.

In step 716, at least an end portion of the diffuser section 104 is scanned with a non-contact, non-destructive imaging system 184. Referring to FIG. 20, this imaging system 184 may be different than the imaging system 158 of FIG. 15 discussed above. For example, the imaging system 184 of FIG. 20 may be configured as an optical imaging system with an optical sensor 186. However, in other embodiments, the imaging system 184 of FIG. 20 and the imaging system 158 of FIG. 15 may be the same.

The imaging system 184 of FIG. 20 is operated to provide scan data. The scan data may be indicative of a visible structure of the scanned portion of the preform component 60'; e.g., the diffuser section 102. The scan data, for example, may be used to provide a feature map of the structure of the scanned portion of the preform component 60'. This feature map may include location and/or dimensional information for the internal locating feature 164. The feature map may also or alternatively include locations and/or dimensional information for other features/elements of the preform substrate 74'. With this information, a processing system 188 may determine a location and/or an orientation of the internal locating feature 164, or at least a portion thereof, relative to the preform component 60' and/or a coordinate system. The internal locating feature 164 may thereby provide/correlate with a datum in the scan data.

Figure 21:
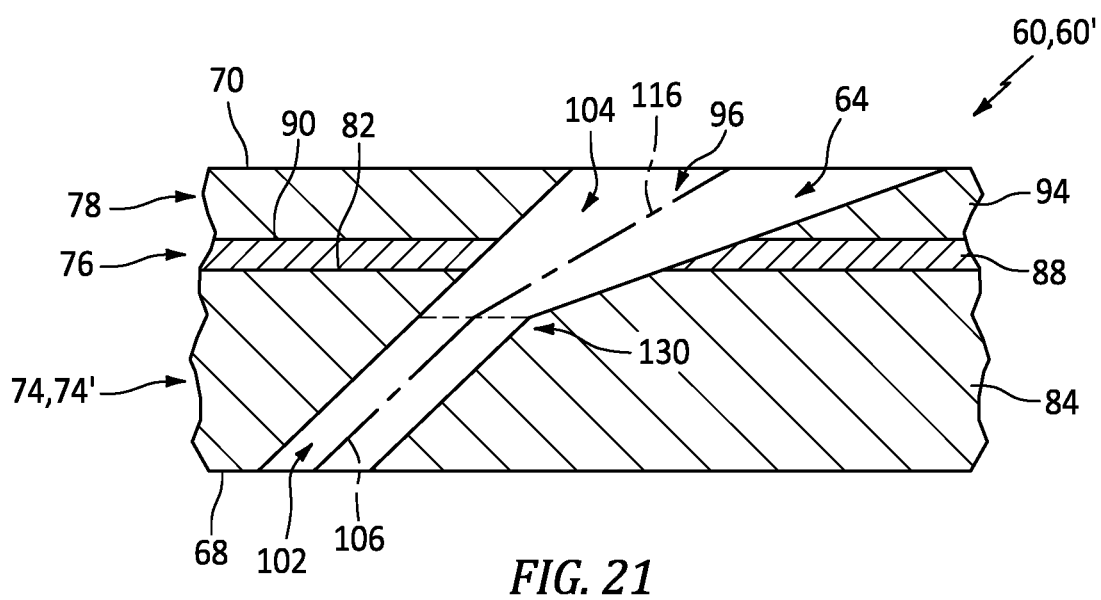
FIG. 21 is a sectional illustration of the preform component (now the fully formed component) further configured with the meter section of the cooling aperture.

In step 718, the meter section 102 of the respective cooling aperture 64 is formed in the preform component 60' using the scan data as shown, for example, in FIG. 21. For example, the scan data and the internal locating feature location and/or orientation information determined therefrom may be used to locate a position of where and/or an orientation of how the meter section 102 should be formed in the preform component 60'. The meter section 102 may then be formed at this location/orientation such that the meter section 102 is located, for example, as specified in a design specification and aligned with the diffuser section 104.

A portion of the substrate material 84 is machined away (from the exterior of the preform component 60') to provide the respective meter section 102. The meter section 102 may be formed in the (e.g., electrically conductive, metal) substrate material 84 using a meter section machining process. This meter section machining process is selected to quickly, precisely and efficiently form the meter section 102 in the electrically conductive, metal substrate material 84. The meter section machining process, for example, may be an electrical discharge machining (EDM) process. The present disclosure, however, is not limited to such an exemplary meter section machining process. The meter section 102, for example, may also or alternatively be formed using one or more other machining processes such as, but not limited to, a laser machining (e.g., ablation) process, a water-jet guided laser (WJGL) machining process, an abrasive water jet (AWJ) machining process, an electron beam machining process, and a mechanical drilling process.

The method 700 is described above as using different machining processes for forming the diffuser section 104 and the meter section 102. However, in other embodiments, one machining process may be used for machining through at least one of the coating materials (e.g., 94), and the other machining process may be used for machining through the remaining material (e.g., 88 and 84). In still other embodiments, the entire cooling aperture 64 may be formed using a common machining process (e.g., a laser machining process, etc.) and in a single forming step.

In some embodiments, the method 700 may be performed without utilizing and scanning for the external locating feature 140. A start location for formation of the diffuser section 104, for example, may be determined using another technique. In other embodiments, the method 700 may be performed without utilizing and scanning for the internal locating feature 164. A start location for formation of the meter section 102, for example, may be determined using another technique, or formed with the diffuser section 104 via a common machining process.

For ease of description, the method 700 is described above with respect to formation of a single cooling aperture 64 of the fluid cooled component 60. However, the fluid cooled component 60 may be formed with multiple of the cooling apertures 64, for example, by repeating the steps 712 and 718. For example, the step 712 may be repeated multiple times to form diffuser sections 104 for multiple cooling apertures 64. The step 718 may then be repeated multiple times to form meter sections 102 for the multiple cooling apertures 64.

The method 700 is described above with reference to a microwave imaging system and an optical imaging system. The present disclosure, however, is not limited to such exemplary imaging systems. For example, the scanning step 710 may also or alternatively be performed by other non-contact, non-destructive imaging systems such as, but not limited to, a micro computed tomography (micro-CT) imaging system, a terahertz imaging system, a flash thermography system, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A manufacturing method, comprising:
providing a preform component for a turbine engine, the preform component including a substrate and a locating feature at an exterior surface of the substrate;
applying an outer coating over the substrate, wherein the outer coating covers the locating feature;
scanning at least a portion of the preform component and the outer coating with an imaging system to provide scan data indicative of a location of the locating feature; and
forming a cooling aperture in the substrate and the outer coating based on the scan data.

2. The manufacturing method of claim 1, wherein the locating feature comprises an indentation in the exterior surface of the substrate.

3. The manufacturing method of claim 1, wherein the locating feature comprises a protrusion projecting out from the exterior surface of the substrate.

4. The manufacturing method of claim 1, wherein the locating feature is removed during the forming of the cooling aperture.

5. The manufacturing method of claim 1, wherein the imaging system comprises a microwave imaging system.

6. The manufacturing method of claim 1, further comprising:
applying an inner coating onto the substrate;
wherein the outer coating is applied onto the inner coating.

7. The manufacturing method of claim 1, wherein the cooling aperture includes a meter section and a diffuser section.

8. The manufacturing method of claim 1, wherein
the cooling aperture includes a first section and a second section;
the forming of the cooling aperture includes
forming the first section in at least the outer coating using a first machining process; and
forming the second section in the substrate using a second machining process that is different than the first machining process.

9. The manufacturing method of claim 8, further comprising:
forming a second locating feature at an end of the first section;
wherein the second section is formed based on a location of the second locating feature.

10. The manufacturing method of claim 9, wherein the second locating feature is formed during the forming of the first section.

11. The manufacturing method of claim 1, wherein
the substrate comprises metal; and
the outer coating comprises ceramic.

12. The manufacturing method of claim 1, wherein the cooling aperture comprises a single lobed diffuser section.

13. The manufacturing method of claim 1, wherein the cooling aperture comprises a multi-lobed diffuser section.

14. The manufacturing method of claim 1, wherein the preform component comprises a preform of an airfoil for the turbine engine.

15. The manufacturing method of claim 1, wherein the preform component comprises a preform of a flowpath wall for the turbine engine.

16. A manufacturing method, comprising:
providing a preform component for a turbine engine, the preform component comprising a substrate;
applying an outer coating over the substrate;
forming a first section of a cooling aperture in at least the outer coating using a first machining process; and
forming a second section of the cooling aperture in the substrate based on a location of a locating feature at an end of the first section.

17. The manufacturing method of claim 16, wherein the locating feature is formed during the forming of the first section.

18. The manufacturing method of claim 16, wherein the locating feature comprises an indentation at the end of the first section.

19. The manufacturing method of claim 16, wherein the locating feature comprises a protrusion at the end of the first section.

20. A manufacturing method, comprising:
providing a preform component for a turbine engine, the preform component comprising a substrate;
applying an outer coating over the substrate;
forming a diffuser section of a cooling aperture in the outer coating and the substrate using a first machining process;
forming an indentation in the substrate at an end of the diffuser section; and
forming a meter section of the cooling aperture in the substrate using a second machining process, wherein the meter section is formed based on a location of the indentation.

* * * * *